US009106822B2

(12) United States Patent
Takita

(10) Patent No.: US 9,106,822 B2
(45) Date of Patent: Aug. 11, 2015

(54) IMAGE APPARATUS WITH MOTION CONTROL

(75) Inventor: Mark Takita, Palo Alto, CA (US)

(73) Assignee: NIKON CORPORATION, Tokyo (JP)

( * ) Notice: Subject to any disclaimer, the term of this patent is extended or adjusted under 35 U.S.C. 154(b) by 673 days.

(21) Appl. No.: 13/376,790

(22) PCT Filed: Jun. 25, 2009

(86) PCT No.: PCT/US2009/048697
§ 371 (c)(1),
(2), (4) Date: Dec. 7, 2011

(87) PCT Pub. No.: WO2010/151262
PCT Pub. Date: Dec. 29, 2010

(65) Prior Publication Data
US 2012/0075487 A1  Mar. 29, 2012

(51) Int. Cl.
H04N 5/232 (2006.01)
H04N 5/225 (2006.01)
H04N 9/73 (2006.01)

(52) U.S. Cl.
CPC ......... *H04N 5/23212* (2013.01); *H04N 5/2256* (2013.01); *H04N 5/23248* (2013.01); *H04N 5/23277* (2013.01); *H04N 9/735* (2013.01)

(58) Field of Classification Search
CPC .......... H04N 5/23248; H04N 5/23258; H04N 5/23287; H04N 5/23267; H04N 5/23254; H04N 5/23212; H04N 9/735; H04N 5/23277; H04N 5/2256
USPC .............................. 348/208.1–208.7; 382/255
See application file for complete search history.

(56) References Cited

U.S. PATENT DOCUMENTS

| 6,486,910 | B1* | 11/2002 | Kaneda et al. ........... 348/208.99 |
| 7,307,653 | B2* | 12/2007 | Dutta ......................... 348/208.7 |
| 7,474,843 | B2* | 1/2009 | Miura ............................. 396/52 |
| 7,843,494 | B2* | 11/2010 | Uemura et al. ............ 348/222.1 |
| 2003/0038779 | A1* | 2/2003 | Baron et al. ................... 345/157 |
| 2003/0076408 | A1* | 4/2003 | Dutta ............................. 348/61 |
| 2005/0212911 | A1 | 9/2005 | Marvit et al. |
| 2006/0044411 | A1* | 3/2006 | Ito et al. ..................... 348/223.1 |
| 2006/0125926 | A1* | 6/2006 | Nishino ................... 348/208.13 |
| 2006/0170782 | A1* | 8/2006 | Stavely ...................... 348/208.6 |
| 2007/0098383 | A1* | 5/2007 | Stavely et al. ................. 396/55 |
| 2007/0165960 | A1* | 7/2007 | Yamada ....................... 382/254 |

(Continued)

OTHER PUBLICATIONS

PCT Transmittal of International Preliminary Report on Patentability for PCT/US2009/048697 (related to present application) dated Dec. 13, 2011, Nikon Corporation.

(Continued)

*Primary Examiner* — Aung S Moe
(74) *Attorney, Agent, or Firm* — Roeder & Broder LLP

(57) ABSTRACT

An image apparatus (10) includes an apparatus frame (224), a capturing system (228), a control feature, an inertial sensor assembly (218), and a control system (216). The control feature influences the image (258) captured by the capturing system (228). The inertial sensor assembly senses motion of the image apparatus. The control system adjusts the control feature based on the sensed motion from the sensor assembly. Thus, the control feature can be easily controlled by the controlled movement of the image apparatus. For example, the inertial sensor assembly can include one or more angular inertial sensors; one or more gyroscopes; and/or one or more accelerometers.

5 Claims, 4 Drawing Sheets

(56) References Cited

U.S. PATENT DOCUMENTS

| | | | |
|---|---|---|---|
| 2007/0172217 A1* | 7/2007 | Toji | 396/53 |
| 2008/0030587 A1 | 2/2008 | Helbing | |
| 2008/0136923 A1* | 6/2008 | Inbar et al. | 348/208.2 |
| 2009/0028537 A1* | 1/2009 | Tamura | 396/55 |
| 2011/0286681 A1* | 11/2011 | Ben-Ezra et al. | 382/255 |

OTHER PUBLICATIONS http://en.wikipedia.org/wiki/Wii_remote, Nov. 30, 2007, pp. 1-17, Wikimedia Foundation, Inc. US.

PCT International Search Report and Written Opinion for PCT/US2009/048697 (related to present application) dated Aug. 27, 2009, Nikon Corporation.

* cited by examiner

IMAGE APPARATUS WITH MOTION CONTROL

BACKGROUND

Cameras are commonly used to capture an image of a scene. Camera designers are constantly searching for easier and quicker ways to control one or more of the control functions of the camera.

SUMMARY

The present invention is directed to an image apparatus for capturing an image of a scene. The image apparatus includes an apparatus frame, a capturing system, a control feature, an inertial sensor assembly, and a control system. The capturing system captures a captured image. The control feature influences the image captured by the capturing system. The inertial sensor assembly senses motion of the image apparatus. The control system adjusts the control feature based on the sensed motion from the sensor assembly. With this design, the control feature can be easily controlled by the controlled movement of the image apparatus. Stated in another fashion, the inertial sensor assembly can be used as a human interface so that the user can control the image apparatus by moving the image apparatus.

In one embodiment, the inertial sensor assembly includes (i) one or more angular velocity sensors that monitor pitching and/or yawing of the image apparatus; (ii) one or more gyroscopes that monitor rotation of the image apparatus; and/or (iii) one or more accelerometers that monitor acceleration of the image apparatus in one or more directions. For example, the inertial sensor assembly can also be used in a vibration reduction system for lens correction.

The one or more control features that can be controlled by the movement of the image apparatus can vary pursuant to the teachings provided herein. As used herein, the term "control feature" shall mean any camera related feature that is commonly adjusted or controlled on an image apparatus such as a camera, and that influences the image captured by the capturing system or the image displayed by the camera. Non-exclusive examples of possible control features that can be controlled by movement of the image apparatus includes (i) activate and deactivate white balance adjustment; (ii) activate and deactivate red eye reduction; (iii) playback captured images; (iv) shuttle through captured images; (v) activate and deactivate the flash; (vii) activate and deactivate vibration reduction; (viii) turn the image apparatus off or on; (ix) control the zoom function on the lens prior to capturing the image; (x) delete a captured image; (xi) activate and deactivate movie mode; (xii) to control the orientation of the image that is displayed; (xiii) control the autofocus on the image apparatus; (xiv) control the zooming of the image during play back mode on the camera (e.g. in a zoomed picture in play back mode, the image can be moved by moving the camera, pan mode in play back). In one embodiment, in play back mode, the camera can be shaken to get a random image playback on the camera. During playback, the camera can be programmed to advance one picture for one short shake, or several pictures, in proportion to the length of the shake. As provided herein, length of shake, direction of shake, force of shake can all be used to control different control features.

The present invention is also directed to a method for controlling an image apparatus. For example, method can include the step of moving the image apparatus in a controlled fashion to control a control feature of the image apparatus.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
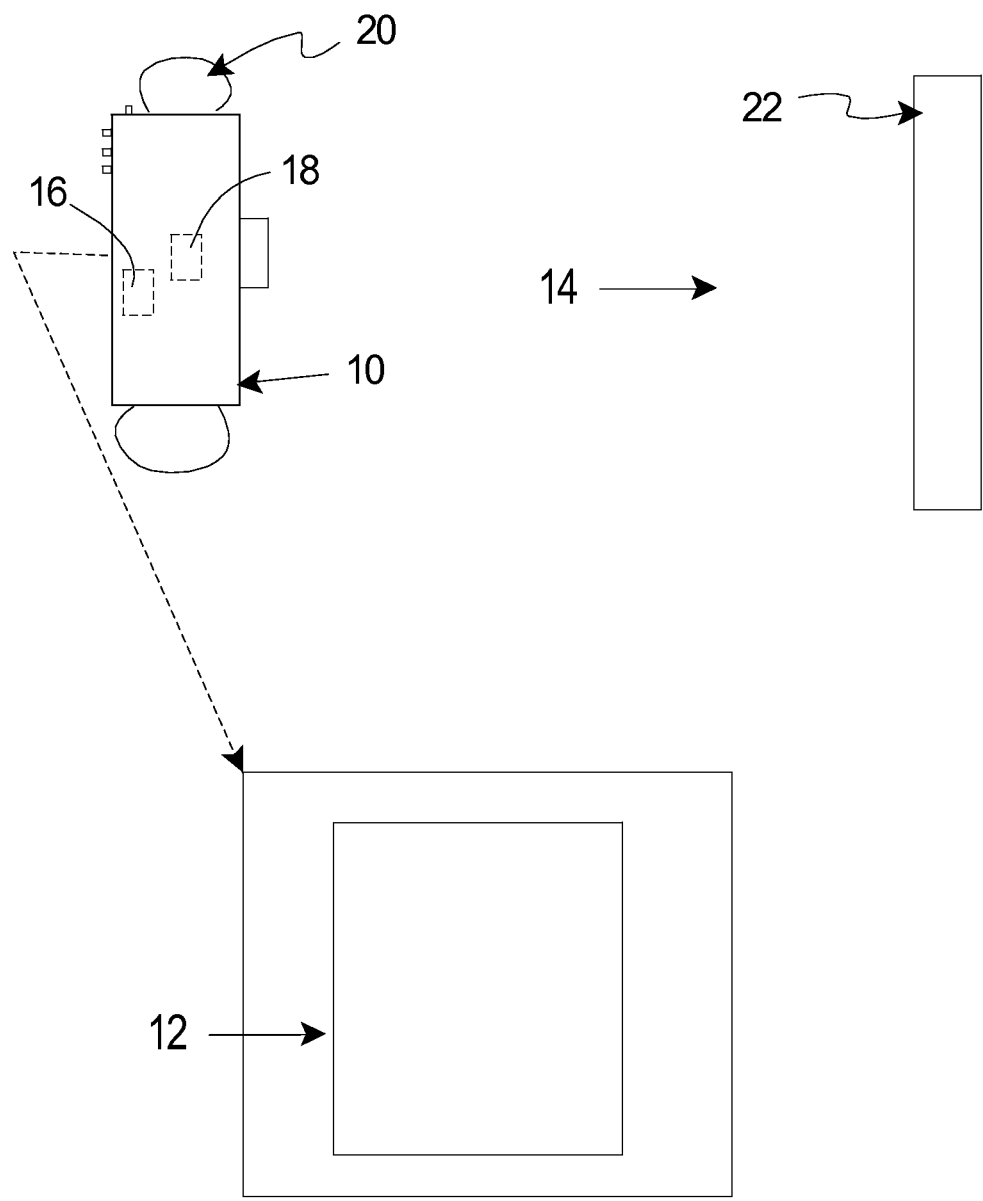
FIG. 1 is a simplified side view of a scene, and an image apparatus having features of the present invention.

FIG. 1 is a simplified side view of an image apparatus 10 having features of the present invention that captures an image 12 (illustrated away from the image apparatus 10), e.g. a picture or a series of images e.g. a video, of a scene 14. As an overview, in certain embodiments, the image apparatus 10 includes a control system 16 (illustrated in phantom) that utilizes information from an inertial sensor assembly 18 (illustrated in phantom) to control one or more control features of the image apparatus 10. With this design, the controlled movement of the image apparatus 10 by a user 20 (fingers are sketched in FIG. 1) can be used to selectively operate one or more of the control features of the image apparatus 10. This simplifies the operation of the one or more control features of the image apparatus 10.

The type of scene 14 captured by the image apparatus 10 can vary. For example, the scene 14 can include one or more animals, plants, mammals, fish, objects, and/or environments. In FIG. 1, the scene 14 includes a single object 22 (illustrated as a square) that is the subject of the scene 14. Alternatively, for example, the scene 14 can include more objects.

In certain embodiments, the image apparatus 10 can be any device capable of capturing the original image, including (i) a digital camera, (ii) a digital camera in video mode, or (iii) a video recorder, for example.

Figure 2A:
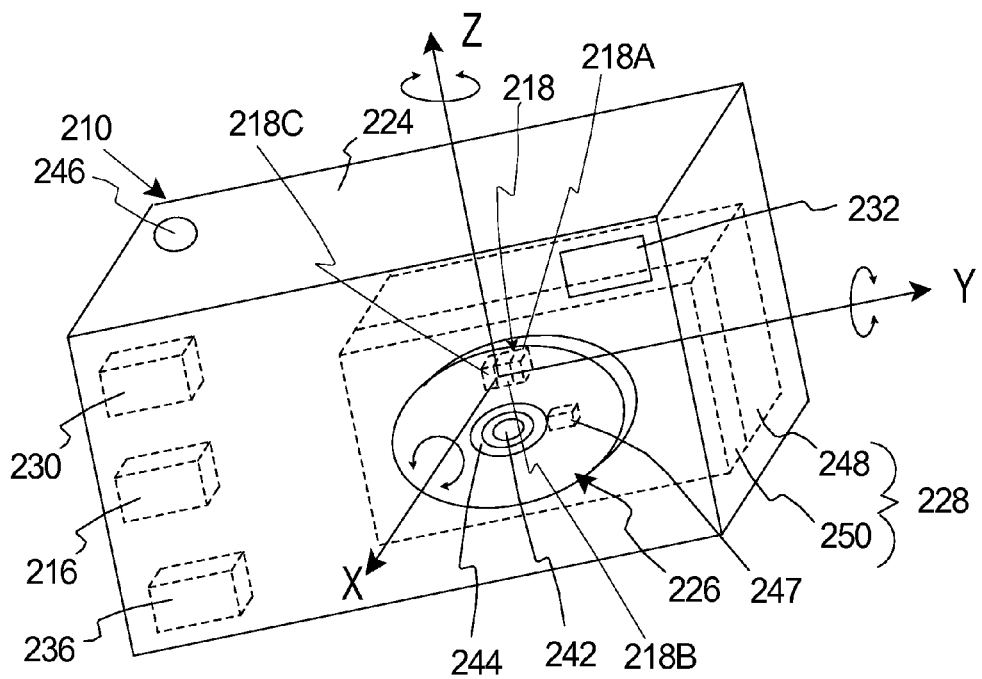
FIG. 2A is a simplified front perspective view of the image apparatus of FIG. 1.
Figure 2B:
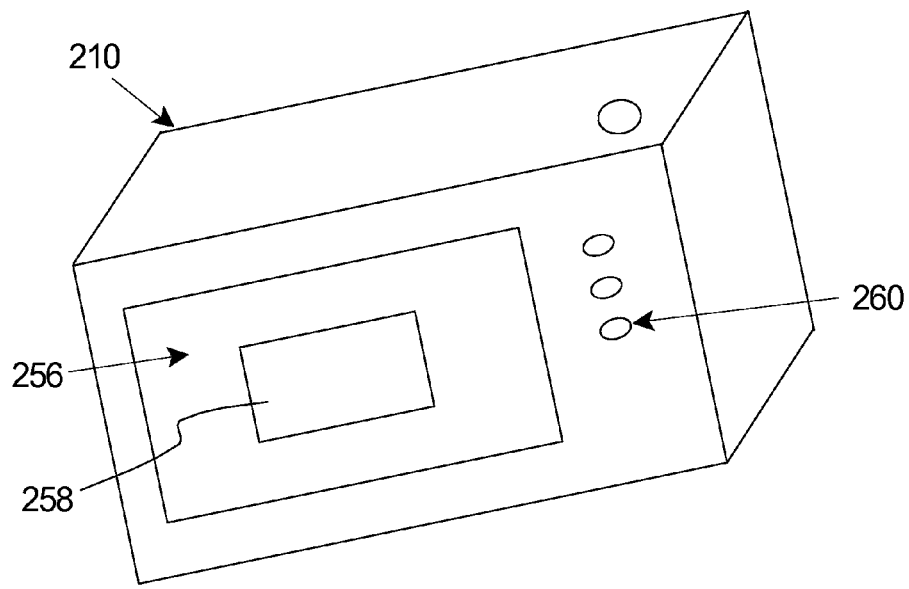
FIG. 2B is a simplified rear perspective view of the image apparatus of FIG. 1.

FIG. 2A illustrates a simplified, front perspective view and FIG. 2B is a simplified, rear perspective view of one, non-exclusive embodiment of the image apparatus 210. In this embodiment, the image apparatus 210 includes an apparatus frame 224, an optical assembly 226, a capturing system 228 (illustrated as a box in phantom), a power source 230 (illustrated as a box in phantom), an illumination system 232, a storage assembly 236 (illustrated as a box in phantom), the inertial sensor assembly 218 (illustrated as a box in phantom), and the control system 216 (illustrated as a box in phantom). The design of these components can be varied to suit the design requirements and type of image apparatus 210. Further, the image apparatus 210 could be designed without one or more of these components. For example, the image apparatus 210 could be designed without the illumination system 232.

The apparatus frame 224 can be rigid and support at least some of the other components of the image apparatus 210. In one embodiment, the apparatus frame 224 includes a generally rectangular shaped hollow body that forms a cavity that receives and retains at least a portion of the capturing system 228, the power source 230, the illumination system 232, the storage assembly 236, and the control system 216. Further, the optical assembly 226 is fixedly secured to the apparatus frame 224.

The apparatus frame 224 can include an aperture 242 and a shutter mechanism 244 that work together to control the amount of light that reaches the capturing system 228. The shutter mechanism 244 can include a pair of blinds (sometimes referred to as "blades") that work in conjunction with each other to allow the light to be focused on the capturing system 228 for a certain amount of time. Alternatively, for example, the shutter mechanism 244 can be all electronic and contain no moving parts. For example, an electronic capturing system 228 can have a capture time controlled electronically to emulate the functionality of the blinds.

The time in which the shutter mechanism 244 allows light to be focused on the capturing system 228 is commonly referred to as the capture time or an exposure time. The length of the exposure time can vary. The shutter mechanism 244 can be activated by a shutter button 246.

The optical assembly 226 can include a single lens or a combination of lenses that work in conjunction with each other to focus light onto the capturing system 228.

In one embodiment, the imaging apparatus 210 includes an autofocus assembly including one or more lens movers 247 (illustrated in phantom) that move one or more lenses of the optical assembly 226 in or out to focus the light on the capturing system 228. Further, one or more of the lens movers 247 can be used to move one or more of the lens for vibration reduction. As provided herein, the autofocus assembly can be an active or passive type system. Further, information from the sensor assembly 218 can be used to control the lens movers 247 to reduce vibration of the lens.

The capturing system 228 captures the captured image 212 during the exposure time. The design of the capturing system 228 can vary according to the type of image apparatus 10. For a digital type camera, the capturing system 228 includes an image sensor 248 (illustrated in phantom), and a filter assembly 250 (illustrated in phantom).

The image sensor 248 receives the light that passes through the aperture 242 and converts the light into electricity. One non-exclusive example of an image sensor 248 for digital cameras is known as a charge coupled device ("CCD"). An alternative image sensor 248 that may be employed in digital cameras uses complementary metal oxide semiconductor ("CMOS") technology.

The image sensor 248, by itself, produces a grayscale image as it only keeps track of the total intensity of the light that strikes the surface of the image sensor 248. Accordingly, in order to produce a full color image, the filter assembly 250 is necessary to capture the colors of the image.

It should be noted that other designs for the capturing system 228 can be utilized.

The power source 230 provides electrical power to the electrical components of the image apparatus 210. For example, the power source 230 can include one or more batteries.

The illumination system 232 can provide a generated light beam, e.g. a flash of light that can be used to illuminate at least a portion of the scene (not shown in FIG. 2A).

The storage assembly 236 stores the various captured images 212. The storage assembly 236 can be fixedly or removably coupled to the apparatus frame 224. Non-exclusive examples of suitable storage assemblies 236 include flash memory, a floppy disk, a hard disk, or a writeable CD or DVD.

Additionally, as illustrated in FIG. 2B, the image apparatus 210 can include an image display 256 that displays the captured images 212.

Additionally, the image display 256 can display other information such as the time of day, and the date.

Moreover, the image apparatus 210 can include one or more control switches 260 electrically connected to the control system 216 that allows the user to control one or more of the control functions of the image apparatus 210. For example, one or more of the control switches 260 can be used to activate the sensor assembly 218 control described herein.

The sensor assembly 218 monitors one or more features related to the motion of at least a portion of the image apparatus 210. For example, the sensor assembly 218 can monitor and determine velocity, rotation, and/or acceleration of the optical assembly 226, the capturing system 228 or the entire image apparatus 210. Further, the sensor assembly 218 can generate motion data that is transferred to the control system 216 to control one or more control functions of the image apparatus 210.

Additionally, the sensor assembly 218 can also be used in a vibration reduction system for the correction of the lens in the optical assembly 226.

FIG. 2A includes an orientation system that illustrates an X axis, a Y axis that is orthogonal to the X axis and a Z axis that is orthogonal to the X and Y axes. It should be noted that these axes can also be referred to as the first, second and third axes and/or the orientation system can have a different orientation than that illustrated in FIG. 2A.

In one non-exclusive embodiment, the sensor assembly 218 can include (i) one or more inertial sensors 218A that monitor movement of the image apparatus 210 along the X, Y and/or Z axes; (ii) one or more angular sensors or gyroscopes 218B that monitor movement of the image apparatus 210 about the X, Y, and/or Z axe axes; and/or (iii) one or more accelerometers 218C that monitor acceleration of the image apparatus 210 along the X, Y and/or Z axes. In one embodiment, the sensor assembly 216 includes vibrating quartz crystals that function like gyroscopes. Essentially, they measure inertial changes and can be used to measure acceleration. Integrating acceleration gives velocity. Integrating velocity gives acceleration.

The location of the sensor assembly 218 can vary. In the embodiment illustrated in FIG. 2A, the sensor assembly 218 is somewhat centrally positioned in the image apparatus 210. Alternatively, for example, the sensor assembly 218 can be positioned near the edges of the image apparatus 210.

As provided above, the sensor assembly 218 can be used to control one or more control features of the image apparatus 210. In one non-exclusive example, (i) a first controlled movement of the image apparatus 210 back and forth along the X axis can generate a first sensor signal that is used to control a first control feature of the image apparatus 210; (ii) a second controlled movement of the image apparatus 210 back and forth along the Y axis can generate a second sensor signal that is used to control a second control feature of the image apparatus 210; (iii) a third controlled movement of the image apparatus 210 back and forth along the Z axis can generate a third sensor signal that is used to control a third control feature of the image apparatus 210; (iv) a fourth controlled movement of the image apparatus 210 about the X axis can generate a fourth sensor signal that is used to control a fourth control feature of the image apparatus 210; (v) a fifth controlled movement of the image apparatus 210 about the Y axis can generate a fifth sensor signal that is used to control a fifth control feature of the image apparatus 210; and/or (vi) a sixth controlled movement of the image apparatus 210 about the Z axis can generate a sixth sensor signal that is used to control a sixth control feature of the image apparatus 210. With this design, the user 20 (illustrated in FIG. 1) can precisely move the image apparatus 210 to generate the desired sensor signal and control the desired control feature It should be noted that only one or more of the controlled movements described above may actually be used in the image apparatus 210. Further, one or more of the controlled movements can happen at approximately the same time. This will allow the user to selectively control two or more control functions at approximately the same time.

It should be noted that other motions with particular patterns could programmed to actuate other control functions of the image apparatus.

In certain embodiments, the motions used to actuate the control functions need to be distinctly different than the motions of normal apparatus shake. For example, the actuation movements are relatively long lived as compared to normal image apparatus 210 shake. Normal vibration motion of the camera is a small amount of motion which happens when a person is trying to hold the camera steady. The deliberate control motions disclosed herein are much longer and have significantly more force.

In another implementation, the through frame images (those displayed on the image display prior to capturing the captured image 212) could be analyzed to deliver the same type of command inputs. For example, image expansion or image diminishment can be used to detect forward or backward movement. Image rotation can be used to detect rotating movements. Direction image movement can be used to detect directional camera movement.

The control system 216 is electrically connected to and controls the operation of the electrical components of the image apparatus 210. The control system 216 can include one or more processors and circuits and the control system 216 can be programmed to perform one or more of the functions described herein.

As provided herein, the control system 216 is electrically connected to and receives the one or more sensor signals from the sensor assembly 218. Subsequently, with the sensor signals, the control system 216 can control one or more control features of the image apparatus 210. As a result thereof, the movement of the image apparatus 210 can be used to control one or more control features of the image apparatus 210.

Alternatively, or additionally, the control system 216 can include software that evaluates the through images captured by the image apparatus 210 and detects possible camera motion from the through images. With this design, the control system 216 can determine camera motion from the captured through images and this information can be used to control one or more of the control features of the image apparatus 210.

The one or more control features that can be controlled by the movement of the image apparatus 210 can vary pursuant to the teachings provided herein. Non-exclusive examples of possible control functions that can be controlled by movement of the image apparatus 210 includes (i) activate and deactivate white balance adjustment; (ii) activate and deactivate red eye reduction; (iii) playback captured images 212 on the image display 256; (iv) shuttle through captured images 212 on the image display 256; (v) activate and deactivate the illumination system 232 (flash mode); (vii) activate and deactivate vibration reduction; (viii) turn the image apparatus 210 off or on; (ix) control the zoom function to adjust the size of the image 212; (x) delete a captured image 212; (xi) activate and deactivate movie mode; (xii) to control the orientation of the image that is displayed; and/or (xiii) control the autofocus on the image apparatus. As provided herein, basically anything that the camera can already be controlled to do, can be controlled by shaking the camera instead of using menus.

It should be noted that any of the control functions described above can be referred to as the first, second, third, fourth, fifth, or sixth control function. It should also be noted that one or more of the control functions described above can be additionally or alternatively controlled by one or more of the control switches 260.

In one non-exclusive example, the sensor assembly 218 can be used to calculate the relative tilt of the image apparatus 210. This information can used to rotate the captured image 212 on the image display 256 so that captured image 212 approximates a horizontally fixed image.

Figure 3:
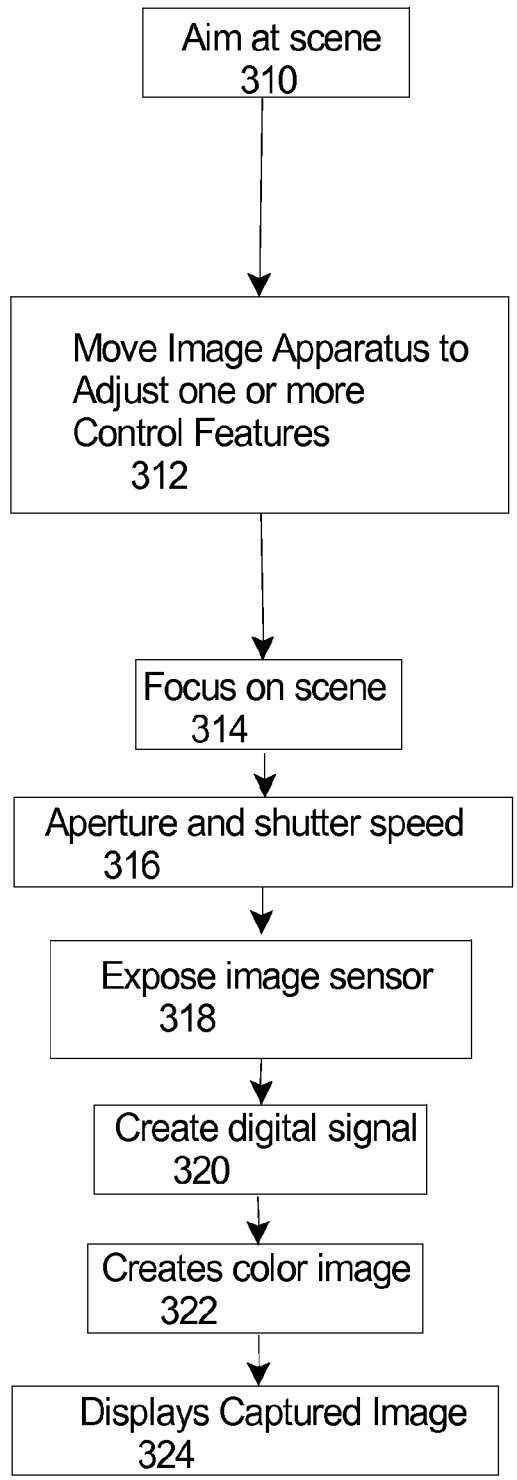
FIG. 3 is a flow chart that further illustrates the features of the present invention.

FIG. 3 is a simplified flowchart that illustrates one non-exclusive example of the operation of the image apparatus. First, the image apparatus is aimed toward the scene 310. Second, the user moves the image apparatus in one or more of the controlled movements described above to control one or more of the control features described above 312. For example, the image apparatus can be moved back and forth along the X axis to adjust the zoom (e.g. move forward to actuate the forward zoom and move backward to activate rearward zoom. Further, the image apparatus can be moved side to side along the Y axis to activate red eye reduction. Moreover, the image apparatus can be moved up and down along the Z axis to activate white balance adjustment.

Next, the user presses lightly on the shutter button to enable the image apparatus to automatically focus on the object(s) 314. Subsequently, the image apparatus sets the aperture and shutter speed 316. Next, the user presses the shutter button all the way, which resets the image sensor, opens the first shutter shade thereby exposing the image sensor to light, building up an electrical charge until the second shutter shade closes thereby preventing further light from reaching the image sensor 318. Simultaneously, the ADC measures the charge at each photosite of the image sensor and creates a digital signal that represents the values of the charge at each photosite 320. Subsequently, the control system interpolates the data from the different photosites, with assistance from the filtering component, to create the color image 322. Finally, the captured image can be displayed on the image display 324.

Figure 4:
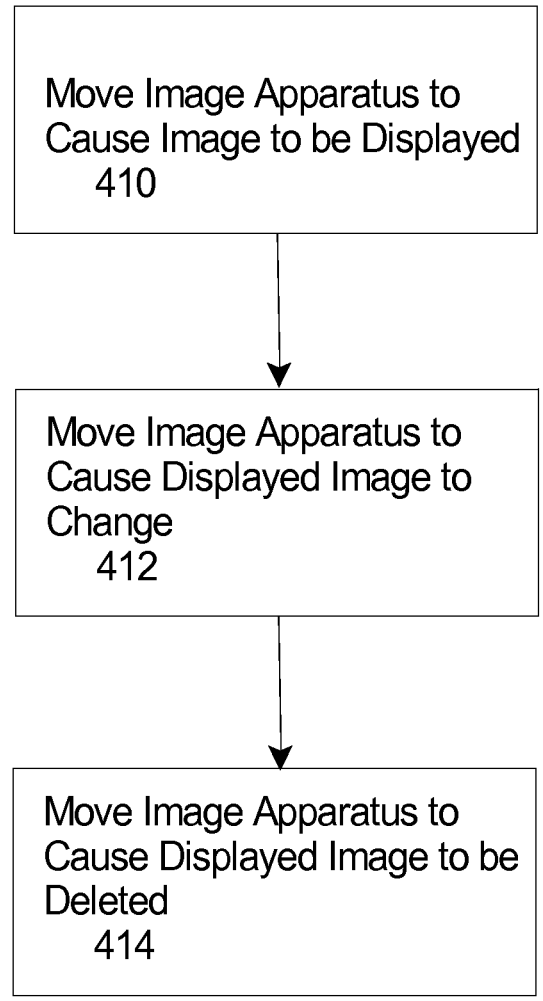
FIG. 4 is a flow chart that additionally illustrates the features of the present invention.

FIG. 4 is a simplified flowchart that illustrates another non-exclusive example of the operation of the image apparatus. First, the user moves the image apparatus in one or more of the controlled movements described above to control one or more of the control features described above. For example, the image apparatus can be rotated about the X axis to cause one of the captured images to be displayed on the image display 410. Next, the image apparatus can be rotated about the Y axis to cause the captured image that is displayed on the image display to change 412. Subsequently, the image apparatus can be rotated about the Z axis to cause the currently displayed captured image to be deleted 414.

It should be noted that the examples provided above are merely two, non-exclusive ways that the control features can be controlled with the controlled movement of the image apparatus by the user.

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. An image apparatus for capturing an image of a scene, the image apparatus comprising:
   a capturing system that captures an image;
   an image display that displays the captured image;
   a control feature that influences the image captured by the capturing system or the image displayed on the image display;
   a sensor assembly that senses motion; and
   a control system that adjusts one of a white balance and a red eye reduction when the sensor assembly senses motion in a first direction, and adjusts the other of the white balance and the red eye reduction when the sensor assembly senses a motion in a second direction that is different from the first direction.

2. The image apparatus of claim 1 wherein the sensor assembly includes an inertia sensor.

3. The image apparatus of claim 1 wherein the sensor assembly includes a gyroscope.

4. The image apparatus of claim 1 wherein the sensor assembly monitors acceleration.

5. An image apparatus for capturing an image of a scene, the image apparatus comprising:
   a capturing system that captures an image and a plurality of through images;
   an image display that displays the captured image;
   a control feature that influences the image captured by the capturing system or the image displayed on the image display; and
   a control system that evaluates at least one of the images to determine if there is motion, and the control system adjusting one of a white balance and a red eye reduction when the control system determines that there is motion in a first direction, and the control system adjusting the other of the white balance and the red eye reduction when the sensor assembly senses a motion in a second direction that is different from the first direction.

* * * * *